United States Patent [19]

Gohin et al.

[11] Patent Number: 4,672,848
[45] Date of Patent: Jun. 16, 1987

[54] ACOUSTIC GYROMETER

[75] Inventors: Christian Gohin, Magny; Henri Leblond, Versailles, both of France

[73] Assignee: Badin Crouzet, Chateaufort, France

[21] Appl. No.: 665,369

[22] Filed: Oct. 26, 1984

[30] Foreign Application Priority Data

Nov. 2, 1983 [FR] France ............................. 83 17513

[51] Int. Cl.$^4$ .............................................. G01P 9/00
[52] U.S. Cl. ...................................................... 73/505
[58] Field of Search .......................................... 73/505

[56] References Cited

U.S. PATENT DOCUMENTS 2,999,389 12/1961 Granqvist ............................ 73/505
3,352,162 11/1967 Hart ..................................... 73/505
3,625,067 12/1971 Emslie .................................. 73/505
4,463,606 8/1984 Barmatz ............................... 73/505
4,520,656 6/1985 Barmatz et al. ...................... 73/505

Primary Examiner—Stewart J. Levy
Assistant Examiner—John E. Chapman, Jr.
Attorney, Agent, or Firm—Stevens, Davis, Miller & Mosher

[57] ABSTRACT

The invention relates to a gyrometer, without material rotor, of the type using the Coriolis forces on the particles of a fluid contained in a resonant cavity. It comprises, in addition to the conventional excitation and detection unit, a unit for effecting servo-control in phase of the longitudinal acoustic oscillation in the cavity and employs a weak coupling mode between exciter and cavity. The gyrometer according to the invention overcomes the variations in length of the cavity and the fluctuations in the speed of propagation of the oscillations in the fluid as a function of the temperature.

8 Claims, 6 Drawing Figures

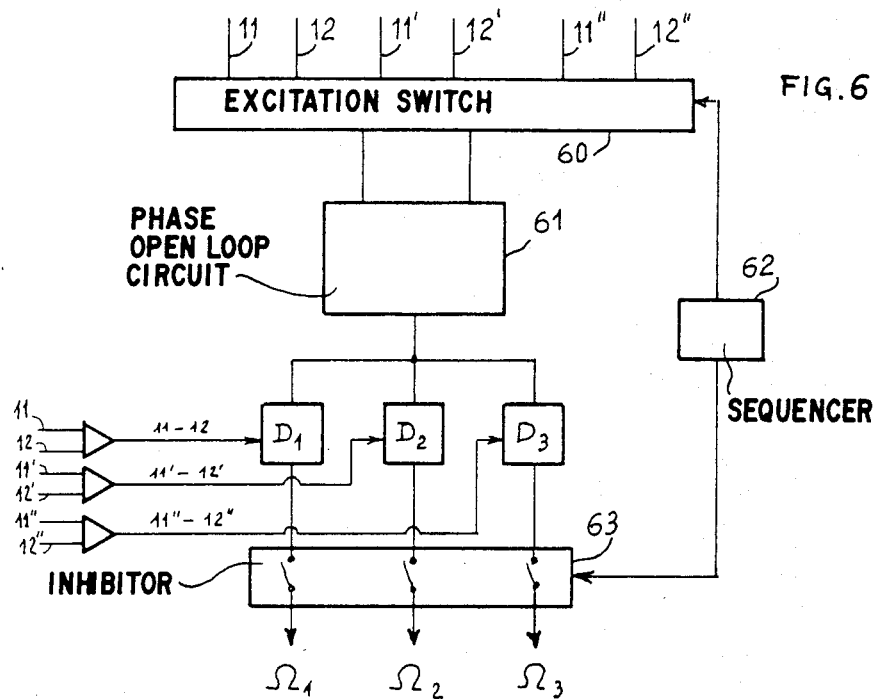
FIG. 6
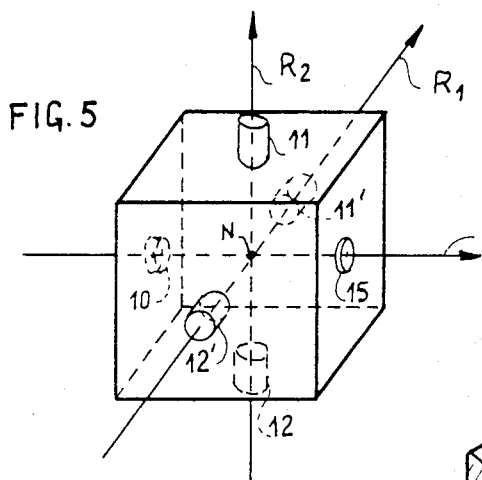
FIG. 5
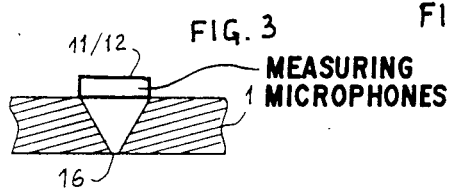
FIG. 3 MEASURING MICROPHONES
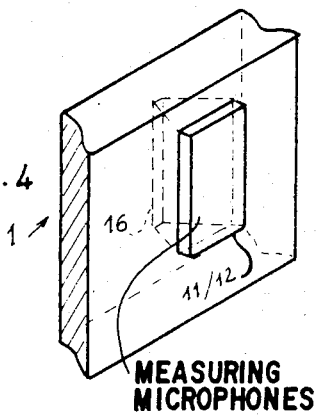
FIG. 4 MEASURING MICROPHONES

ACOUSTIC GYROMETER

BACKGROUND OF THE INVENTION

The present invention relates to gyrometers without material rotor, of the type employing the influence of the Coriolis forces on the particles of a fluid contained in a resonant cavity, and comprising excitation means for generating and maintaining longitudinal acoustic oscillations in said cavity along an axis of excitation, and means for measuring the transverse pressure variations appearing at the level of a vibration node, along an axis of measurement, when the cavity pivots about an axis perpendicular to the plane of the oscillations.

In known devices of this type, such as the acoustic gyrometer described in U.S. Pat. No. 2,999,389, an electric oscillation generator causes a diaphragm, disposed at the bottom of a closed cavity, to vibrate via a trip coil. A longitudinal acoustic wave is established in the cavity. As a function of the dimensions of the cavity and of the excitation frequency, the acoustic wave is arranged to present a pressure node at a well determined point. When the cavity pivots about an axis perpendicular to the plane of the oscillations, the Coriolis forces generate a stationary oscillatory mode, transverse to the excitation mode, of which the amplitude is proportional to the speed of rotation of the cavity. To measure this transverse acoustic pressure, which represents the amplitude of the transverse oscillation, two tubes are disposed on either side of the cavity on an axis of measurement, located at the level of the pressure mode, to transmit the variations in pressure to a differential microphone.

It is admitted that the speed of rotation of the cavity may be deduced from the following relationship:

$$F = 2 p \Omega \mu \cdot \sin \omega_1 t$$

wherein p is the mass of the gaseous molecules,
$\mu$. the amplitude of the instantaneous sinusoidal speed of excitation of the molecules,
$\Omega$ the angular speed of rotation of the card,
$\omega_1$ the frequency of oscillation of the molecules,
F the amplitude of the transverse pressure variations due to the Coriolis forces.

However, in practice, such a gyrometer presents drawbacks:

It is delicate to produce since the half wave length of the acoustic excitation wave must correspond exactly to the length of the cavity, failing which the position of the pressure node, on which the measurements are effected, will be imprecise.

The influence of the harmonics is not negligible and is translated by errors in measurements.

The coupling between the excitation member and the gas is important, which brings about a low quality factor, which is the ratio of the resonant frequency to the bandwidth, of the resonant cavity and a considerable influence of the defects of the exciters on the exact location of the pressure node; the use of a differential microphone connected to the cavity by pressure pick-up tubes creates phase-shifts due to the pneumatic delays; in addition, the coupling with the cavity is not negligible due to the size of the diameters of the necessary pipes with respect to the wave-length of the oscillations.

SUMMARY OF THE INVENTION

The acoustic gyrometer according to the invention overcomes these drawbacks. It comprises, in addition to the known devices, means for effecting servo-control in phase of the longitudinal acoustic oscillation in the cavity. It is characterized in that the natural frequency of the cavity, along the axis of measurement, is the same as the natural frequency of the cavity along its axis of excitation. It is also characterized in that a weak mode of coupling between exciter and cavity is used, obtained by employing an exciter whose acoustic impedance is very high with respect to the acoustic impedance of the fluid contained in the cavity.

Servo-control in phase of the cavity overcomes the variations in length of the cavity and the fluctuations in the speed of propagation of the oscillations in the fluid as a function of the temperature. In addition, due to the permanent phase servo-control, the position of the loops of the excitation wave, therefore of the node used for the measurements, is stabilized and corresponds strictly to the position of the measuring microphones. The effects of the harmonics are eliminated by comparison of the wave emitted with a strictly sinusoidal reference wave. Another means for improving the performances of a gyrometer according to the invention consists in using a weak mode of coupling between exciter and acoustic cavity. To this end, an exciter is used whose acoustic impedance is very high with respect to the acoustic impedance of the gas contained in the cavity. This makes is possible to have a high quality factor for the cavity.

This may be carried out in two ways:
either by using an exciter constituted by a piezoelectric disc of very small diameter with respect to the dimensions of the cavity. In that case, spherical waves are generated;
or by using an exciter of large diameter but of very small thickness, of the order of some microns. In that case, flat waves are generated.

To eliminate the detrimental influence of the tubes as described in U.S. Pat. No. 2,999,389, the variations in pressure, at the level of the node of the acoustic wave, are measured by means of two microphones mounted in differential and disposed in the cavity or in the immediate vicinity thereof. This arrangement eliminates the effects of pneumatic delays and the parasitic signals generated by the vibrations or the acoustic sounds of the carrier on which the gyrometer is mounted.

The orifice for coupling these microphones to the cavity is formed by an extremely fine slot, which makes it possible to conserve dimensions, in the directions of the excitation wave, which are much reduced with respect to the wave length, whilst conserving a sufficient section of passage.

BRIEF DESCRIPTION OF THE DRAWINGS

The invention will be more readily understood on reading the following description with reference to the accompanying drawings, in which:

FIGS. 3 and 4 show the embodiment of a slot for coupling.

FIG. 5 shows a resonant cavity for 2-axis gyrometer.

FIG. 6 schematically shows a 3-axis gyrometer.

DETAILED DESCRIPTION OF A PREFERRED EMBODIMENT OF THE INVENTION

Figure 1:
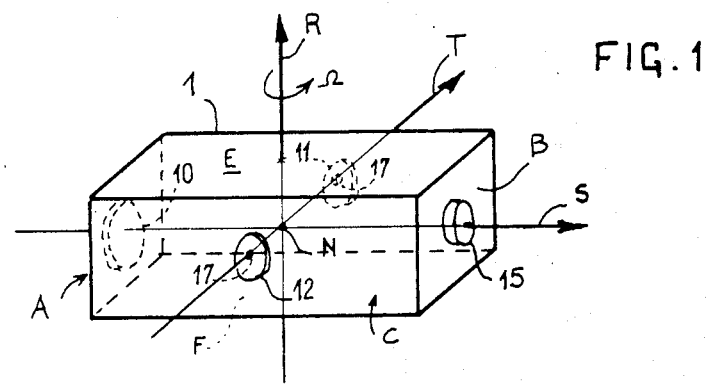
FIG. 1 shows a resonant cavity with its privileged axes of use.

For a one-axis gyrometer, the resonant cavity is advantageously a volume, symmetrical about its longitudinal axis S, made of metal. It may for example be a cylinder or a rectangular parallelepiped 1, as shown in FIG. 1.

For a one-axis gyrometer, the opposite walls E and F, on the axis R corresponding to the axis of rotation, are of square section, of the order of 40×40 mm² and spaced from each other by about 27 mm. This cavity is excited acoustically by means of the transducer 10 disposed on wall A. This transducer is constituted by a disc made of piezoelectric material with a diameter of 20 mm and a thickness of some microns. Such a disc furnishes a sound level of about 100 dB. The resonance frequency at excitation is about 4350 Hz at ambient temperature. When the cavity is filled with air, its quality factor reaches 150.

Under these conditions, a wave node N is established at the centre of the cavity on its transverse axis T. Two measuring microphones 11 and 12 are disposed on each of the two parallel faces of the parallelepiped, intersected by the transverse axis T, and adjusted exactly at a spot where a pressure node prevails, viz. at the centre of the cavity in the example in question. Insofar as the quality factor of the cavity is sufficiently high, no signal is observed at the terminals of the microphones 11 and 12, mounted in differential, in the absence of movement of rotation of the device about axis R. It should be noted that it is possible to use only one microphone. The rotation of the cavity about axis R, or any other axis parallel to R, modifies the vibratory state of the molecules of the gas contained in the cavity.

Figure 2:
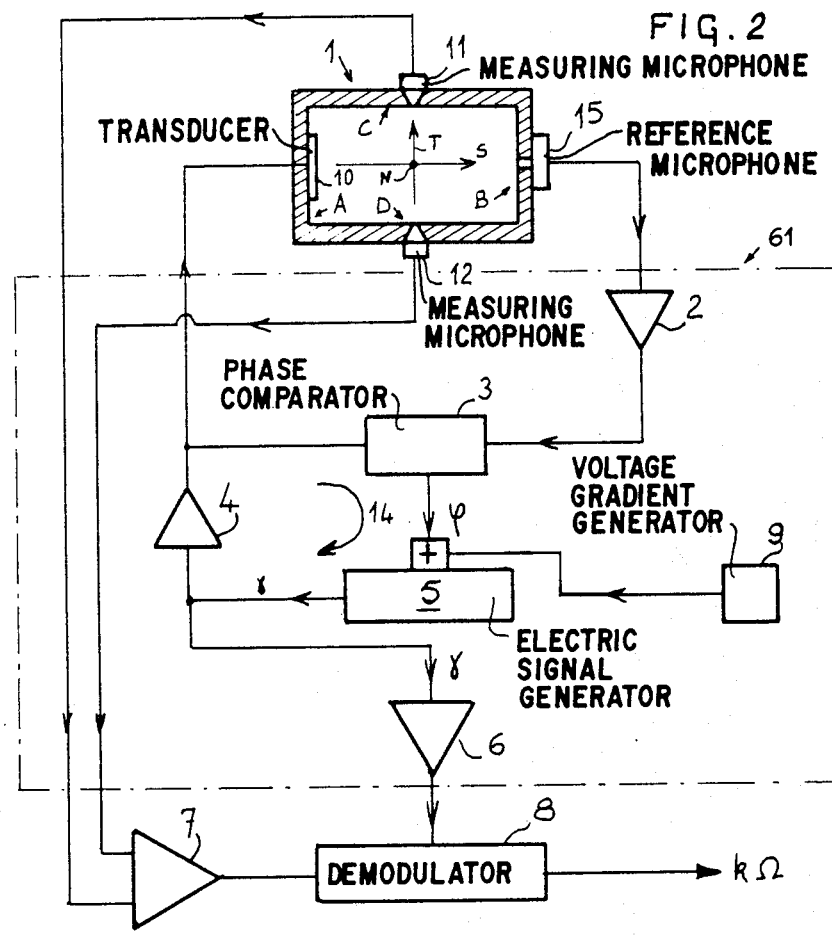
FIG. 2 schematically shows a gyrometer according to the invention.

During rotation, an acoustic wave, whose direction of propagation T (FIG. 2) is at right angles to the longitudinal axis S, is formed and is detected by the measuring microphones 11 and 12. The amplitude of this wave is proportional to the speed of rotation of the cavity about axis R, or any other parallel axis. A phase open-loop 61 makes it possible to maintain the stationary wave state set in phase with respect to the cavity and to the resonance frequency of said cavity, whatever these variations in frequency, for example consecutive to a variation in temperature of the fluid contained in the cavity I. This device maintains the pressure node at the centre of the cavity, independently of all the disturbing effects, which fundamentally improves the characteristics of this type of gyrometer.

This loop is made by a phase comparator 3 which delivers a signal $\phi$ proportional to the phase shift existing between the acoustic pressure waves respectively present on walls A and B. This signal $\phi$ controls an electric signal generator 5, of the voltage-control, variable-frequency oscillator type. The signal $\phi$ is cancelled when the following conditions are fulfilled:

frequency of the generator = acoustic resonance frequency of the cavity;
phase-shift through 180° between the acoustic pressures at the level of walls A and B.

Any variation of one of these conditions will be measured by the phase comparator 3 which will generate the correction voltage $\phi$ and the system will be regulated automatically. The output signal $\gamma$ of the oscillator 5, after amplification by an amplifier 4, is injected into the exciter 10, whilst the signal collected by the reference microphone 15 is shaped by a comparator-amplifier 2.

The signal k$\Omega$ indicative of the angular velocity to be measured is obtained by a conventional demodulation of the signals issuing from the measuring microphones 11-12, amplified and filtered by an amplifier 7. To this and, a demodulator 8 is synchronized by the signal $\gamma$ of the generator 5 after shaping across an amplifier 6.

To start the oscillations in the cavity, a starting device 9 allows the initial excitation before phase setting of the whole. This device consists in a voltage gradient generator allowing the scanning of the whole resonance range of the cavity. This starting signal is applied to the oscillator 5 on its input in summation with the signal $\phi$. Once the oscillation is obtained, at the natural frequency of the acoustic cavity, it is the signal $\phi$ which controls the frequency evolutions of the oscillator.

To avoid any parasitic coupling of the cavity with the reference microphone or the measuring microphones, the latter are of very small size. They are constituted for example by microphones with electret of 5 mm diameter and coupled to the cavity by a hole 17 of 0.8 mm diameter and a depth of 1 mm. To further improve the performances in sensitivity and especially in stability, a slot may be used for the acoustic coupling of the transverse waves, along axis T, with the measuring microphones 11 and 12. This makes it possible to reduce the dimensions of the measuring pressure take-off orifices along the longitudinal axis of excitation S, and consequently exactly to locate the zone of measurement on the pressure node N of the excitation wave whilst eliminating the pneumatic delays. Good results are obtained with slots 16, 10 mm long and 0.05 mm wide, made in the walls C and D of the cavity, as shown in FIGS. 3 and 4.

In a variant embodiment, it is possible to make gyrometers with 2 or 3 axes of sensitivity.

To make a two-axis gyrometer, as shown in FIG. 5, the resonant cavity must be symmetrical about the axis of excitation S, for example cubic, cylindrical or spherical, in order to be able to dispose two pairs of measuring microphones 11-12 and 11'-12' along two orthogonal axes in a plane perpendicular to the axis of excitation S and passing through the node N of the oscillations. In this way, measurement by the microphones 11-12 makes it possible to detect the rotations about the axis R1, and measurement by microphones 11'-12', the rotations about axis R2. In this case, an additional electronic circuit is necessary, comprising a second demodulator exploiting the signals issuing from the measuring microphones 11' and 12' in manner identical to the demodulator already described.

A three-axis gyrometer necessitates a resonant cavity having a centre of symmetry, such as a cube or a sphere for example.

Under these conditions, identical elements disposed along three orthogonal axes are used as exciters, reference microphones and measuring microphones, in order to use them alternately as exciters, reference or measuring microphones by successive switchings, depending on the rotations $\Omega 1$, $\Omega 2$ or $\Omega 3$ to be measured. FIG. 6 schematically shows the embodiment of such a 3-axis gyrometer. The three pairs of microphones 11,12-11',12' and 11",12" are connected to an excitation switch 60 whose purpose is to successively select a pair of microphones as exciter-reference microphone couple, and to place it in connection with the phase open-loop circuit 61.

The measurements 11–12, 11'–12', 11"–12" arrive respectively on three demodulators D1, D2 and D3 of which the signals are selected by means of an output inhibitor 63 along the axis of rotation $\Omega 1$, $\Omega 2$ or $\Omega 3$ to be considered.

A sequencer 62 ensures the successive exploitation in time of the combinations of the microphones, as exciters or as measuring microphones.

The device according to the invention lends itself particularly well to the production of reliable gyrometers adapted to operate in a wide temperature range such as those used in the domain of aeronautics.

What is claimed is:

1. A gyrometer of the type employing the influence of the Coriolis force on a fluid contained in a resonant cavity and comprising exciting means for generating and maintaining longitudinal acoustic oscillations in said cavity along an axis of excitation, and means for measuring the transverse pressure variations appearing at the level of a vibration node along an axis of measurement, when the cavity is displaced about an axis perpendicular to the plane of the oscillations, characterized in that means are provided for effecting servo-control in phase of the acoustic excitation wave of the cavity, whereby the phase difference of the acoustic pressures on the two walls of the cavity perpendicular to the excitation axis, respectively, is maintained at a constant value, thus resulting in resonance of the cavity said cavity having a natural frequency along said axis of measurement which is the same as a natural frequency along said axis of excitation, and wherein said exciting means maintains the frequency of said oscillations equal to said natural frequency along said axis of measurement and said natural frequency along said axis of excitation.

2. The gyrometer of claim 1, characterized in that a weak coupling mode between said exciting means and said cavity is used, obtained by employing an exciter of which the acoustic impedance is very high with respect to the acoustic impedance of the fluid contained in the cavity.

3. The gyrometer of claim 2, characterized in that the exciter is constituted by a piezoelectric disc whose diameter is very small with respect to the dimensions of the cavity.

4. The gyrometer of claim 2, characterized in that the exciter is constituted by a disc of large diameter with respect to the dimensions of the cavity, and of very small thickness, of the order of some microns.

5. The gyrometer of claim 1, characterized in that the means for measuring the pressure variations consist in two microphones mounted in differential on either side of the cavity.

6. The gyrometer of claim 5, characterized in that the microphone or microphones are each coupled to the cavity by means of a very fine slot.

7. The gyrometer of claim 1, characterized in that two simultaneous orthogonal measurements of speed of rotation are possible by using a resonant cavity symmetrical about the axis of excitation and possessing two pairs of measuring microphones disposed along two orthogonal axes in a plane perpendicular to the axis of excitation.

8. The gyrometer of claim 1, characterized in that a switching system at emission and at reception makes it possible to measure, by successive sampling of a sequencer, the speeds of rotation about three orthogonal axes.

* * * * *